US012586571B2

(12) United States Patent
Danielescu et al.

(10) Patent No.: US 12,586,571 B2
(45) Date of Patent: Mar. 24, 2026

(54) EFFICIENT SPEECH TO SPIKES CONVERSION PIPELINE FOR A SPIKING NEURAL NETWORK

(71) Applicant: Accenture Global Solutions Limited, Dublin (IE)

(72) Inventors: Lavinia Andreea Danielescu, San Francisco, CA (US); Kenneth Michael Stewart, Irvine, CA (US); Noah Gideon Pacik-Nelson, Boston, MA (US); Timothy M. Shea, Merced, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 395 days.

(21) Appl. No.: 18/118,619

(22) Filed: Mar. 7, 2023

(65) Prior Publication Data

US 2023/0290340 A1 Sep. 14, 2023

Related U.S. Application Data

(60) Provisional application No. 63/317,873, filed on Mar. 8, 2022.

(51) Int. Cl.
*G10L 15/16* (2006.01)
*G10L 21/013* (2013.01)
*G10L 25/24* (2013.01)

(52) U.S. Cl.
CPC ............ *G10L 15/16* (2013.01); *G10L 21/013* (2013.01); *G10L 25/24* (2013.01)

(58) Field of Classification Search
CPC ....... G10L 15/16; G10L 21/013; G10L 25/24; G10L 15/063; G10L 15/02
See application file for complete search history.

(56) References Cited

U.S. PATENT DOCUMENTS

| 2019/0115011 A1* | 4/2019 | Khellah ................. | G10L 15/02 |
| 2020/0074989 A1* | 3/2020 | Barch .................... | G06N 3/045 |

(Continued)

FOREIGN PATENT DOCUMENTS

| JP | 2009230337 | 10/2009 |
| JP | 2016090670 | 5/2016 |

(Continued)

OTHER PUBLICATIONS

Kasabov, Nikola, et al. "Evolving spatio-temporal data machines based on the NeuCube neuromorphic framework: Design methodology and selected applications." Neural Networks 78 (2016): 1-14. (Year: 2016).*

(Continued)

*Primary Examiner* — Bhavesh M Mehta
*Assistant Examiner* — Jangwoen Lee
(74) *Attorney, Agent, or Firm* — Mannava & Kang, P.C.

(57) ABSTRACT

Methods, systems, and apparatus, including computer programs encoded on computer storage media, for converting audio to spikes for input to a spiking neural network configured to recognize speech based on the spikes are described. In some aspects, a method includes obtaining audio data and generating frequency domain audio signals that represent the audio data by converting the audio data into a frequency domain. The frequency domain audio signals are mapped into a set of Mel-frequency bands to obtain Mel-scale frequency audio signals. A log transformation is performed on the Mel-scale frequency audio signals to obtain log-Mel signals. Spike input is generated for input to a spiking neural network (SNN) model by converting the log-Mel signals to the series of spikes. The spike input is provided as an input to the SNN model.

19 Claims, 6 Drawing Sheets

(56) References Cited

U.S. PATENT DOCUMENTS

| | | | | |
|---|---|---|---|---|
| 2022/0254332 A1* | 8/2022 | Cartwright | ............ | G10L 15/005 |
| 2023/0298573 A1* | 9/2023 | Kwag | .................... | G10L 25/15 |
| | | | | 704/200 |

FOREIGN PATENT DOCUMENTS

| | | |
|---|---|---|
| JP | 2017526224 | 9/2017 |
| JP | 2020524300 | 8/2020 |
| JP | 2021515283 | 6/2021 |
| JP | 2022509754 | 1/2022 |
| JP | 2022544065 | 10/2022 |

OTHER PUBLICATIONS

Abdollahi et al., "Speaker-independent isolated digit recognition using an AER silicon cochlea," Presented at Proceedings of 2011 IEEE Biomedical Circuits and Systems Conference (BioCAS), San Diego, CA, USA, Nov. 10-12, 2011, 269-272.

Anumula et al., "Feature Representations for Neuromorphic Audio Spike Streams," Frontiers in Neuroscience, Feb. 9, 2018, 12:23, 12 pages.

Attig et al., "System Latency Guidelines Then and Now—Is Zero Latency Really Considered Necessary?," Presented at Proceedings of the International Conference on EEngineering Psychology and Cognitive Ergonomics: Cognition and Design, Vancouver, Canada, Jul. 9-14, 2017; Lecture Notes in Computer Science, May 18, 2017, 10276:3-14.

Blouw et al., "Benchmarking Keyword Spotting Efficiency on Neuromorphic Hardware," Presented at Proceedings of the 7th Annual Neuro-inspired Computational Elements Workshop (NICE '19), Albany, NY, USA, Mar. 26-28, 2019, 8 pages.

Brandli et al., "A 240 x 180 130 dB 3 μs Latency Global Shutter Spatiotemporal Vision Sensor," IEEE Journal of Solid-State Circuits, Sep. 2, 2014, 49(10):2333-2341.

Branigan et al., "Linguistic alignment between people and computers.," Journal of Pragmatics, Sep. 2010, 42(9):2355-2368.

Chakrabartty et al., "Exploiting spike-based dynamics in a silicon cochlea for speaker identification," Presented at Proceedings of 2010 IEEE International Symposium on Circuits and Systems, Paris, France, May 30-Jun. 2, 2010, 513-516.

Chang et al., "Low Latency Speech Recognition using End-to-End Prefetching," Presented at Proceedings of Interspeech 2020, Shanghai, China, Oct. 25-29, 2020, 1962-1966.

CNVRG.io [online], "Basic Guide to Spiking Neural Networks for Deep Learning," available on or before Jun. 3, 2021 via Internet Archive: Wayback Machine URL<https://web.archive.org/web/20210603120221/https://cnvrg.io/spiking-neural-networks/>, retrieved on Jul. 17, 2023, retrieved from URL<https://cnvrg.io/spiking-neural-networks/>, 18 pages.

Courbariaux et al., "BinaryConnect: training deep neural networks with binary weights during propagations," Presented at Proceedings of the 28th International Conference on Neural Information Processing Systems, Montreal, Canada, Dec. 7-12, 2015, 3123-3131.

Cramer et al., "Surrogate gradients for analog neuromorphic computing," Proceedings of the National Academy of Sciences, Jan. 14, 2022, 119(4):e2109194119, 9 pages.

Cramer et al., "The Heidelberg Spiking Data Sets for the Systematic Evaluation of Spiking Neural Networks," IEEE Transactions on Neural Networks and Learning Systems, Dec. 30, 2020, 33(7):2744-2757.

Das et al., "EdgeBench: Benchmarking Edge Computing Platforms," Presented at Proceedings of the 2018 IEEE/ACM International Conference on Utility and Cloud Computing Companion (UCC Companion), Zurich, Switzerland, Dec. 17-20, 2018, 175-180.

Davies et al., "Advancing Neuromorphic Computing With Loihi: A Survey of Results and Outlook," Proceedings of the IEEE, Apr. 6, 2021, 109(5):911-934.

Davies et al., "Loihi: A Neuromorphic Manycore Processor with On-Chip Learning," IEEE Micro, Jan. 16, 2018, 38(1):82-99.

Duda, "Accurate, Guaranteed Stable, Sliding Discrete Fourier Transform [DSP Tips & Tricks]," IEEE Signal Processing Magazine, Oct. 18, 2010, 27(6):124-127.

Dupeyroux et al., "A toolbox for neuromorphic sensing in robotics," CoRR, submitted on Oct. 5, 2021, arXiv:2103.02751v2, 7 pages.

Eshraghian et al., "Training spiking neural networks using lessons from deep learning," CoRR, submitted on Jan. 14, 2022, arXiv:2109.12894v4, 44 pages.

Extended Search Report in European Appln. No. 23160733.4, dated Jun. 20, 2023, 7 pages.

Feng et al., "Quantifying bias in automatic speech recognition," CoRR, submitted on Apr. 1, 2021, arXiv:2103.15122v2, 5 pages.

Fourniol et al., "Analog Ultra Low-Power Acoustic Wake-Up System Based on Frequency Detection," Presented at Proceedings of the 2018 IEEE International Conference on Internet of Things and Intelligence System (IOTAIS), Bali, Indonesia, Nov. 1-3, 2018, 109-115.

Guamán et al., "Device Control System for a Smart Home using Voice Commands: A Practical Case," Presented at Proceedings of the 2018 10th International Conference on Information Management and Engineering, Salford, United Kingdom, Sep. 22-24, 2018, 86-89.

Gutierrez-Galan et al., "OpenNAS: Open Source Neuromorphic Auditory Sensor HDL code generator for FPGA implementations," Neurocomputing, May 14, 2021, 436:35-38.

HBR.org [online], "Voice Recognition Still Has Significant Race and Gender Biases," May 10, 2019, retrieved on Jul. 17, 2023, retrieved from URL<https://hbr.org/2019/05/voice-recognition-still-has-significant-race-and-gender-biases>, 6 pages.

Hu et al., "v2e: From Video Frames to Realistic DVS Events," Presented at Proceedings of the 2021 IEEE/CVF Conference on Computer Vision and Pattern Recognition Workshops (CVPRW), Nashville, TN, USA, Jun. 19-25, 2021, 1312-1321.

Hubara et al., "Quantized neural networks: training neural networks with low precision weights and activations," The Journal of Machine Learning Research, Jan. 1, 2017, 18(1):6869-6898.

Kaiser et al., "Synaptic Plasticity Dynamics for Deep Continuous Local Learning (DECOLLE)," Frontiers in Neuroscience, May 12, 2020, 14:424, 11 pages.

Kasabov et al., "Evolving spatio-temporal data machines based on the NeuCube neuromorphic framework: Design methodology and selected applications," Neural Networks, Jun. 2016, 78:1-14.

Kingma et al., "Adam: A Method for Stochastic Optimization," CoRR, submitted on Dec. 22, 2014, arXiv:1412.6980v1, 9 pages.

Koenecke et al., "Racial disparities in automated speech recognition," Proceedings of the National Academy of Sciences, Mar. 23, 2020, 117(14):7684-7689.

Kulkarni et al., "Hyperarticulation detection in repetitive voice queries using pairwise comparison for improved speech recognition," Presented at Proceedings of the 2017 IEEE International Conference on Acoustics, Speech and Signal Processing (ICASSP), New Orleans, LA, USA, Mar. 5-9, 2017, 4985-4989.

Leow et al., "Development of a Low-Latency and Real-Time Automatic Speech Recognition System," Presented at Proceedings of the 2020 IEEE 9th Global Conference on Consumer Electronics (GCCE), Kobe, Japan, Oct. 13-16, 2020, 925-928.

Li et al., "Improving RNN Transducer Modeling for End-to-End Speech Recognition," Presented at Proceedings of the 2019 IEEE Automatic Speech Recognition and Understanding Workshop (ASRU), Singapore, Dec. 14-18, 2019, 8 pages.

Li et al., "Real-time speaker identification using the AEREAR2 event-based silicon cochlea," 2012 IEEE International Symposium on Circuits and Systems (ISCAS), Seoul, South Korea, May 20-23, 2012, 1159-1162.

Liu et al., "Asynchronous Binaural Spatial Audition Sensor With 2×64×4 Channel Output," IEEE Transactions on Biomedical Circuits and Systems, Aug. 2014, 8(4):453-464.

Mazumder et al., "Multilingual Spoken Words Corpus," Presented at Proceedings of the 35th Conference on Neural Information Processing Systems (NeurIPS 2021) Track on Datasets and Benchmarks, Virtual Event, Dec. 7-10, 2021, 17 pages.

(56)                References Cited

OTHER PUBLICATIONS

McFee et al., "librosa: Audio and Music Signal Analysis in Python," Presented at Proceedings of the 14th Python in Science Conference, Austin, TX, USA, Jul. 6-12, 2015, 18-24.

Moritz et al., "Streaming Automatic Speech Recognition with the Transformer Model," Presented at Proceedings of ICASSP 2020-2020 IEEE International Conference on Acoustics, Speech and Signal Processing (ICASSP), Barcelona, Spain, May 4-8, 2020, 6074-6078.

Neftci et al., "Surrogate Gradient Learning in Spiking Neural Networks," IEEE Signal Processing Magazine, Nov. 5, 2019, 36(6):51-63.

Neti, "Neuromorphic speech processing for noisy environments," Presented at Proceedings of 1994 IEEE International Conference on Neural Networks (ICNN'94), Orlando, FL, USA, Jun. 28-Jul. 2, 1994, 4425-4430.

Nguyen et al., "Low Latency ASR for Simultaneous Speech Translation," CoRR, submitted on Mar. 22, 2020, arXiv:2003.09891v1, 5 pages.

Oviatt et al., "Linguistic Adaptations During Spoken and Multimodal Error Resolution," Language and Speech, Dec. 1998, 41(3-4):419-442.

Perez-Nieves et al., "Neural heterogeneity promotes robust learning," Nature Communications, Oct. 4, 2021, 12(1):5791, 9 pages.

Perez-Nieves et al., "Sparse Spiking Gradient Descent," CoRR, submitted on Jan. 13, 2022, arXiv:2105.08810v2, 27 pages.

Sainath et al., "A Streaming On-Device End-to-End Model Surpassing Server-Side Conventional Model Quality and Latency," Presented at Proceedings of ICASSP 2020-2020 IEEE International Conference on Acoustics, Speech and Signal Processing (ICASSP), Barcelona, Spain, May 4-8, 2020, 6059-6063.

Shrestha et al., "SLAYER: Spike Layer Error Reassignment in Time," Presented at Proceedings of the 32nd Conference on Neural Information Processing Systems (NeurIPS 2018), Montreal, Canada, Dec. 3-8, 2018, 1412-1421.

Stewart et al., "Gesture similarity analysis on event data using a hybrid guided variational auto encoder," CoRR, submitted on Mar. 31, 2021, arXiv:2104.00165v1, 10 pages.

Stewart et al., "Meta-learning spiking neural networks with surrogate gradient descent," CoRR, submitted on Jan. 26, 2022, arXiv:2201.10777v1, 18 pages.

Stewart et al., "On-chip Few-shot Learning with Surrogate Gradient Descent on a Neuromorphic Processor," CoRR, submitted on Nov. 5, 2019, arXiv:1910.04972v6, 5 pages.

Sudharsan et al., "AI Vision: Smart speaker design and implementation with object detection custom skill and advanced voice interaction capability," Presented at Proceedings of the 2019 11th International Conference on Advanced Computing (ICoAC), Chennai, India, Dec. 18-20, 2019, 97-102.

Tatman et al., "Effects of Talker Dialect, Gender & Race on Accuracy of Bing Speech and YouTube Automatic Captions," Presented at Proceedings of Interspeech 2017, Stockholm, Sweden, Aug. 20-24, 2017, 934-938.

Tatman, "Gender and Dialect Bias in YouTube's Automatic Captions," Presented at Proceedings of the First ACL Workshop on Ethics in Natural Language Processing, Valencia, Spain, Apr. 4, 2017, 53-59.

Van Schaik et al., "AER EAR: a matched silicon cochlea pair with address event representation interface," 2005 IEEE International Symposium on Circuits and Systems (ISCAS), Kobe, Japan, May 23-26, 2005, 4213-4216.

WandB.ai [online], "Weights & Biases—The developer-first MLOps platform," available on or before Jan. 1, 2021 via Internet Archive: Wayback Machine URL<https://web.archive.org/web/20210101164848/https://wandb.ai/site>, retrieved on Jul. 18, 2023, retrieved from URL<https://wandb.ai/site>, 10 pages.

Warden, "Speech Commands: A Dataset for Limited-Vocabulary Speech Recognition," CoRR, submitted on Apr. 9, 2018, arXiv:1804.03209v1, 11 pages.

Watts et al., "Improved implementation of the silicon cochlea," IEEE Journal of Solid-State Circuits, May 1992, 27(5):692-700.

Wu et al., "Deep Spiking Neural Networks for Large Vocabulary Automatic Speech Recognition," Frontiers in Neuroscience, Mar. 17, 2020, 14:199, 14 pages.

Yao et al., "Temporal-wise Attention Spiking Neural Networks for Event Streams Classification," CoRR, submitted on Jul. 25, 2021, arXiv:2107.11711v1, 10 pages.

Yin et al., "Accurate and efficient time-domain classification with adaptive spiking recurrent neural networks," Nature Machine Intelligence, Oct. 14, 2021, 3(10):905-913.

Zenke et al., "SuperSpike: Supervised learning in multi-layer spiking neural networks," CoRR, submitted on Oct. 14, 2017, arXiv:1705.11146v2, 25 pages.

Zenke et al., "The Remarkable Robustness of Surrogate Gradient Learning for Instilling Complex Function in Spiking Neural Networks," Neural Computation, Mar. 26, 2021, 33(4):899-925.

Office Action in Japanese Appln. No. 2023-035501, dated Apr. 9, 2024, 12 pages (with English translation).

* cited by examiner

300

Obtain audio data                                                    302

Convert the audio data into a frequency domain to obtain
frequency domain audio signals                                       304

Map the frequency domain audio signals to a set of Mel-scale
frequency bands and obtain log-Mel signals                           306

Convert the log-Mel signals to spikes                                308

Process the spikes using SNNs for speech recognition                 310

EFFICIENT SPEECH TO SPIKES CONVERSION PIPELINE FOR A SPIKING NEURAL NETWORK

CROSS-REFERENCE TO RELATED APPLICATIONS

This application claims priority to U.S. Provisional Patent Application No. 63/317,873, filed Mar. 8, 2022, which is hereby incorporated by reference in its entirety for all purposes.

TECHNICAL FIELD

This specification generally relates to audio processing and machine learning.

BACKGROUND

Speech recognition involves technologies for recognizing and translating spoken words into text. Speech recognition is used in many contexts, including speech-to-text processing and voice interfaces in which people interact with electronic devices using voice commands.

SUMMARY

Edge computing is a distributed computing paradigm that brings computation and data storage closer to the sources of data. Edge computing can improve response time and save bandwidth. Edge devices are the computing devices that process data on a local level. However, edge devices may have limited computing capability compared to a traditional server computer.

Brain-inspired neuromorphic hardware and Spiking Neural Network models (SNNs) which run on the neuromorphic hardware can provide desirable benefits that make them well-suited for speech recognition for an edge device. Neuromorphic processors have the benefits of low power, low latency, and continuous learning. For example, neuromorphic processors have the potential to reduce power consumption during speech recognition inference by several orders of magnitude compared to CPU or GPU accelerators. The neuromorphic processors can enable a wide range of power-constrained devices, such as edge devices, to support speech recognition using a larger vocabulary than other speech recognition techniques such as digital signal processing. Neuromorphic systems process sparse, event-based data which can enable low latency inference across a variety of applications including speech recognition. Neuromorphic systems can support continuous learning algorithms for SNNs.

The techniques described in this document provide an efficient audio to spikes conversion pipeline that converts speech into spikes for input to SNNs and is suitable for real-time operation with low-power neuromorphic processors such that the conversions and speech recognition can be performed quickly and efficiently by edge devices. For example, this document describes a pipeline and corresponding techniques for converting raw audio, including streamed audio, to spikes fast enough for real-time speech recognition at edge devices.

The audio to spikes conversion pipeline can include hyperparameters that control how the pipeline processes audio data to convert the audio data into spike input for an SNN. Hyperparameter sweeps can be performed on the audio to spikes pipeline to optimize, or at least improve, the hyperparameters of the pipeline which results in more efficient (e.g., requiring fewer computations and/or fewer processor cycles) and faster conversions of audio data into spikes. For example, the hyperparameter sweep process can determine the relative importance of hyperparameters and the processing associated with some hyperparameters may no longer be performed if the hyperparameter is not important. This reduces the amount of processing of the audio data (or intermediate forms of the audio data) without negatively impacting the accuracy of the conversion.

According to some implementations, a method performed by one or more data processing apparatus includes obtaining audio data; generating frequency domain audio signals that represent the audio data by converting the audio data into a frequency domain; mapping the frequency domain audio signals into a set of Mel-frequency bands to obtain Mel-scale frequency audio signals; performing a log transformation on the Mel-scale frequency audio signals to obtain log-Mel signals; generating spike input including a series of spikes for input to a spiking neural network (SNN) model by converting the log-Mel signals to the series of spikes; and providing the spike input as an input to the SNN model. Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following features. In some aspects, the method includes executing, the SNN model using the spike input. The spiking neural network processes the series of spikes to generate speech recognition results including text corresponding to the audio data and outputting the speech recognition results.

Some aspects include performing an action based on the speech recognition results. In some aspects, obtaining the audio data comprises obtaining the audio data from a memory or obtaining the audio data from an active microphone.

In some aspects, converting the audio data into the frequency domain includes centering and scaling the audio signals to obtain centered and scaled audio data and converting the centered and scaled audio data into a frequency domain using a sliding window of a predetermined length. In some aspects, converting the audio data into the frequency domain includes converting the audio data using a sliding discrete Fourier transform (SDFT) algorithm.

In some aspects, converting the log-Mel signals to spike input includes determining a step-wise difference between the log-Mel signals of two adjacent time steps, determining that the step-wise difference satisfies a threshold in either a positive or negative direction, and generating a spike of a corresponding polarity. In some aspects, converting the log-Mel signals into spikes includes determining cumulative sum spikes by calculating a quantized total of each log-Mel signal.

In some aspects, converting the log-Mel features into spikes includes stacking the log-Mel features for a plurality of times to obtain stacked features in a plurality of blocks; and converting the stacked features in the plurality of blocks into spikes.

In some aspects, the one or more components of the audio to spikes conversion pipeline comprises hyperparameters that are adjusted based on a classification accuracy. Some aspects include, for each hyperparameter configuration of a plurality of sets of hyperparameter configurations: applying the hyperparameter configurations to the one or more components of the audio to spikes conversion pipeline; training multiple test SNN models using training audio data that is converted to spike inputs using the one or more components of the audio to spikes conversion pipeline; and testing each test SNN model using testing data, the testing comprising generating result data by determining an accuracy of speech recognition results generated by each test SNN model; and updating the hyperparameters based on the result data for each set of hyperparameters.

Some aspects include determining an importance of each hyperparameter based on the result data for each set of hyperparameters, wherein updating the hyperparameters comprises updating at least one hyperparameter based on the importance of the at least one hyperparameter.

Some aspects include preventing use of a particular hyperparameter in generating the spike input based on the importance of the given hyperparameter.

The methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Like reference numbers and designations in the various drawings indicate like elements.

DETAILED DESCRIPTION

This specification is generally related to an audio to spikes conversion pipeline that can encode audio data into spikes for input to an SNN that is trained to generate speech recognition results that include predicted speech sounds in the audio data. The audio to spikes conversion pipeline includes a set of computational operations, each of which is configured, e.g., optimized, for efficient real-time execution and to generate sparse information-rich representation of the raw audio signal. The pipeline can include a combination of stages that provide low latency and require minimal computational overhead to convert audio data, which can be streaming audio input received by the pipeline, into spikes. The spikes can be used for real-time speech recognition by power-constrained devices, such as edge devices with low-power neuromorphic processors.

Figure 1:
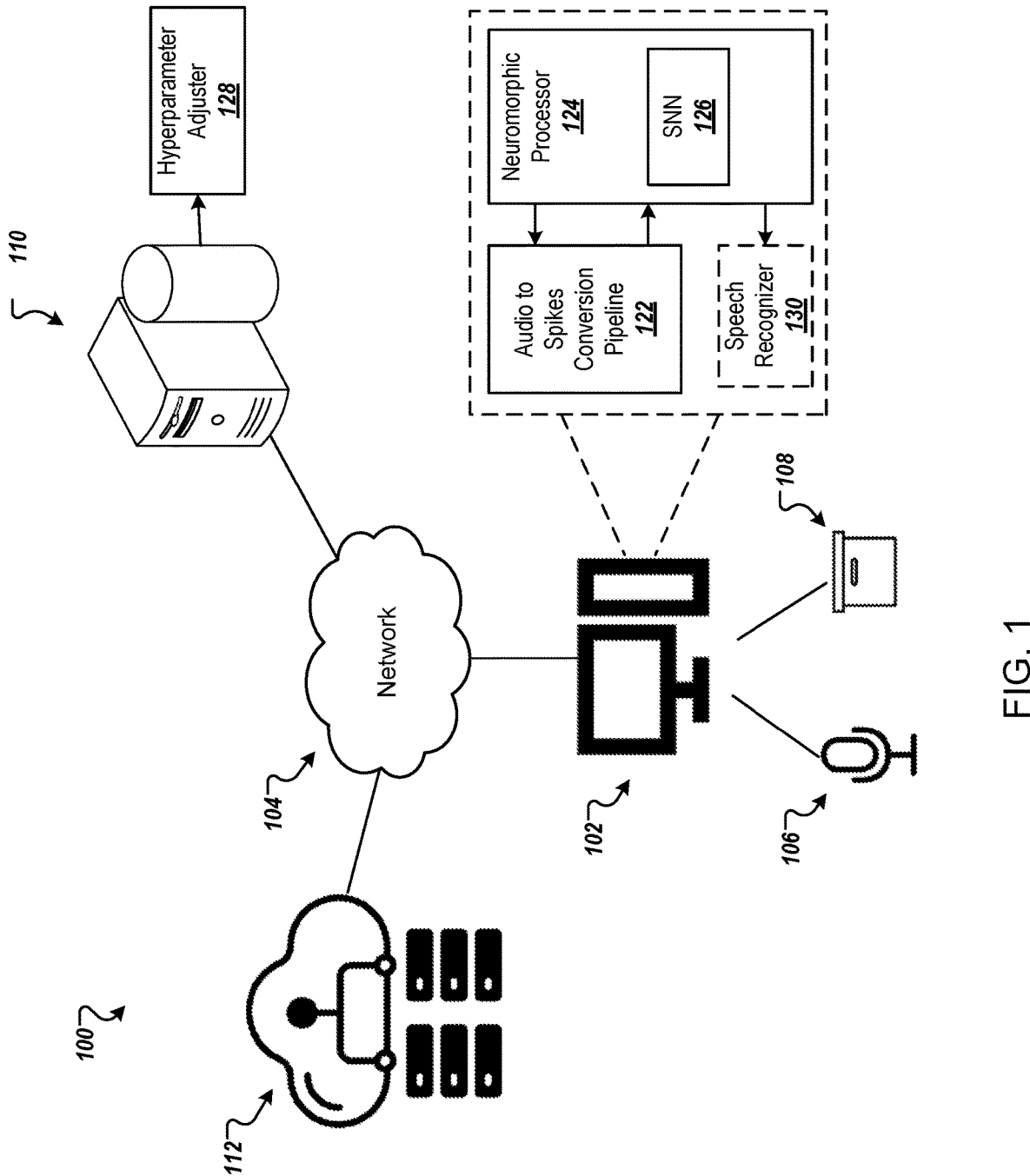
FIG. 1 is a block diagram of an example environment in which a computing device processes audio data to recognize speech sounds in the audio data.

FIG. 1 is a block diagram of an example environment 100 in which a computing device 102 processes audio data to recognize speech sounds in the audio data. The example environment 100 includes the computing device 102, a remote server 110, a cloud server 112, and a data communication network 104, such as a local area network (LAN), a wide area network (WAN), the Internet, a mobile network, or a combination thereof. However, as described below, all of the audio processing can occur at the computing device 102 without transmitting or receiving data from either server 110, 112, which improves the speed at which speech is recognized at the computing device 102, e.g., by precluding roundtrip communications over the network 104, and reduces bandwidth consumption on the network 104.

The computing device 102 can obtain audio data from a microphone 106 or a storage device 108. In some examples, the microphone 106 can be a component (e.g., sensor) included in the computing device 102. In other examples, the microphone 106 can be an Internet of Things (IoT) device, networked device, or a wired device, connected with the computing device 102. In some examples, the computing device 102 can obtain the audio data from a memory, e.g., memory of the computing device 102 or the data storage device 108. In either case, the audio data can be in the form of raw audio (e.g., that has not been processed) and can contain speech in the form of spoken words.

In some implementations, the computing device 102 can be an edge device that processes data on a local level. For example, Internet of things (IoT) devices can generate large volumes of data during their operations. Instead of transmitting the large volumes of IoT data to a remote server 110 or a cloud server 112 over network 104, the edge device can process the IoT data locally reducing the bandwidth needs of the large volumes of data. In some implementations, the edge device can be a power-constrained device compared with the remote server 110 and the cloud server 112. Edge devices can be IoT computing devices, smart cameras, smart speakers, embedded computers, mobile devices, and even smart TVs or other connected devices. In a particular example, the computing device 102 can be a smart speaker or smartphone that includes and/or is communicably coupled to (e.g., via the network 104) an artificial intelligence (AI) assistant that performs tasks based on recognized speech of a user.

The computing device 102 includes an audio to spikes conversion pipeline 122 and a neuromorphic processor 124. The audio to spikes conversion pipeline 122 can be implemented using hardware (e.g., a processor, such as a central processing unit (CPU)) and/or software.

The audio to spikes conversion pipeline 122 is configured to convert audio data into spikes for processing by the neuromorphic processor 124. A series of spikes output by the audio to spikes conversion pipeline 122 for audio data can be referred to as speech input that is provided as input to a SNN 126 executed by the neuromorphic processor 124. The audio to spikes conversion pipeline 122 can include multiple processing stages to convert the audio data into the spikes. These stages are described in more detail with reference to FIGS. 2-4B. The audio to spikes conversion pipeline 122 is efficient and suitable for real-time operation. For example, the stages of the audio to spikes conversion pipeline 122 are configured to convert streamed raw audio to spikes fast enough for real-time speech recognition by the neuromorphic processor 124.

The neuromorphic processor 124 is configured to perform speech recognition tasks using a SNN 126. For example, the neuromorphic processor 124 can execute the SNN 126 to predict speech sounds represented by the spikes of the spike input output by the audio to spikes conversion pipeline 122. For example, the SNN 126 can process the spikes to generate speech recognition results that include predicted speech sounds, e.g., in the form of textual phonemes, triphones, full words, or other units of sound, corresponding to speech of the audio data.

In some implementations, e.g., if the SNN 126 is not configured to output words as the predicted speech sounds, the computing device 102 can include a speech recognizer 130 that is configured to determine words and/or sentences corresponding to the phonemes or other non-word predicted speech sounds output by the neuromorphic processor 124. For example, the speech recognizer 130 can include lexicons and/or language models that are configured to convert phonemes into words and/or sentences. In this way, the computing device 102 can convert audio data into words, phrases, and/or sentences without requiring network communications.

In some implementations, the computing device 102 can send predicted speech sounds to the server(s) 110, 112 for converting the speech sounds into words and/or sentences. For example, one or both servers 110, 112 can include the speech recognizer 130 or multiple speech recognizer components, e.g., respective language models for various regions and their different languages and dialects. The server(s) 110, 112 can provide the words and/or sentences back to the computing device 102 or perform an action based on the words and/or sentences. For example, the server(s) 110, 112 can include an AI assistant that performs tasks based on spoken commands received from users' computing devices 102.

One or both servers 110, 112 can include a hyperparameter adjuster 128, which can be implemented in hardware and/or software. In some implementations, the hyperparameter adjuster 128 can be part of the computing device 102. The hyperparameter adjuster 128 can evaluate SNNs and adjust hyperparameters of the audio to spikes conversion pipeline 122 based on the evaluation. Example hyperparameters of the audio to spikes conversion pipeline 122 are described with reference to FIG. 2. For example, the hyperparameter adjuster 128 can perform hyperparameter sweeps using multiple sets of hyperparameter configurations and select a hyperparameter configuration based on the results of the sweeps. Each sweep can include applying a particular hyperparameter configuration to the audio to spikes conversion pipeline 122, training multiple SNNs using training data and spikes generated by the audio to spikes conversion pipeline 122 based on the training data, testing each of the multiple SNNs using testing data, measuring the accuracy of each SNN based on the test. The training data and/or the testing data can include labeled audio data with labels indicating predicted speech sounds, e.g., words or phonemes, corresponding to the audio data.

The hyperparameter adjuster 128 can adjust the hyperparameters of the audio to spikes conversion pipeline 122 based on the evaluation. For example, the hyperparameter adjuster 128 can identify the hyperparameter configuration for which the most accurate SNN was trained during the sweeps and apply that hyperparameter configuration to the audio to spikes conversion pipeline 122.

The hyperparameter adjuster 128 can also determine the relative importance of each hyperparameter based on the results of each sweep. For example, if there is a significant change in the accuracy of the SNNs trained during the sweeps when the configuration of a particular hyperparameter is adjusted, then the particular hyperparameter may have a large impact on the accuracy of the SNNs and is therefore important. The hyperparameter adjuster 128 can evaluate various factors in assessing the importance of each hyperparameter, such as the variance in accuracy of SNNs with changes to the hyperparameter, whether the hyperparameter contributed to the highest accuracy SNN or at least a threshold number of the highest accuracy SNNs, the computation cost of the hyperparameter, the power required by the hyperparameter, loss function minimization, and/or other appropriate factors.

The hyperparameter adjuster 128 can modify the audio to spikes conversion pipeline 122 based on the relative importance of the hyperparameters. For example, the hyperparameter adjuster 128 can determine updated configurations (e.g., updated code for software components) of the audio to spikes conversion pipeline 122 and send the updated configurations to the computing device 102.

In some cases, the hyperparameter adjuster 128 can modify the configuration of a hyperparameter corresponding to a software component of the audio to spikes conversion pipeline 122 such that the software component is no longer active if the hyperparameter is determined to have no or low importance. The processing of audio data or intermediate forms of audio data based on each hyperparameter has an associated computation cost (e.g., CPU cycles) and latency. By removing those that are less important, the conversion of audio data to spikes can be performed faster and more efficiently with little or no negative impact on accuracy of the speech recognition results of the SNN 126. However, some hyperparameters may be more important for some languages and/or dialects. Thus, having the ability to use many hyperparameters and filter some based on importance enables highly accurate speech recognition with highly efficient speech to spikes conversions.

Figure 5:
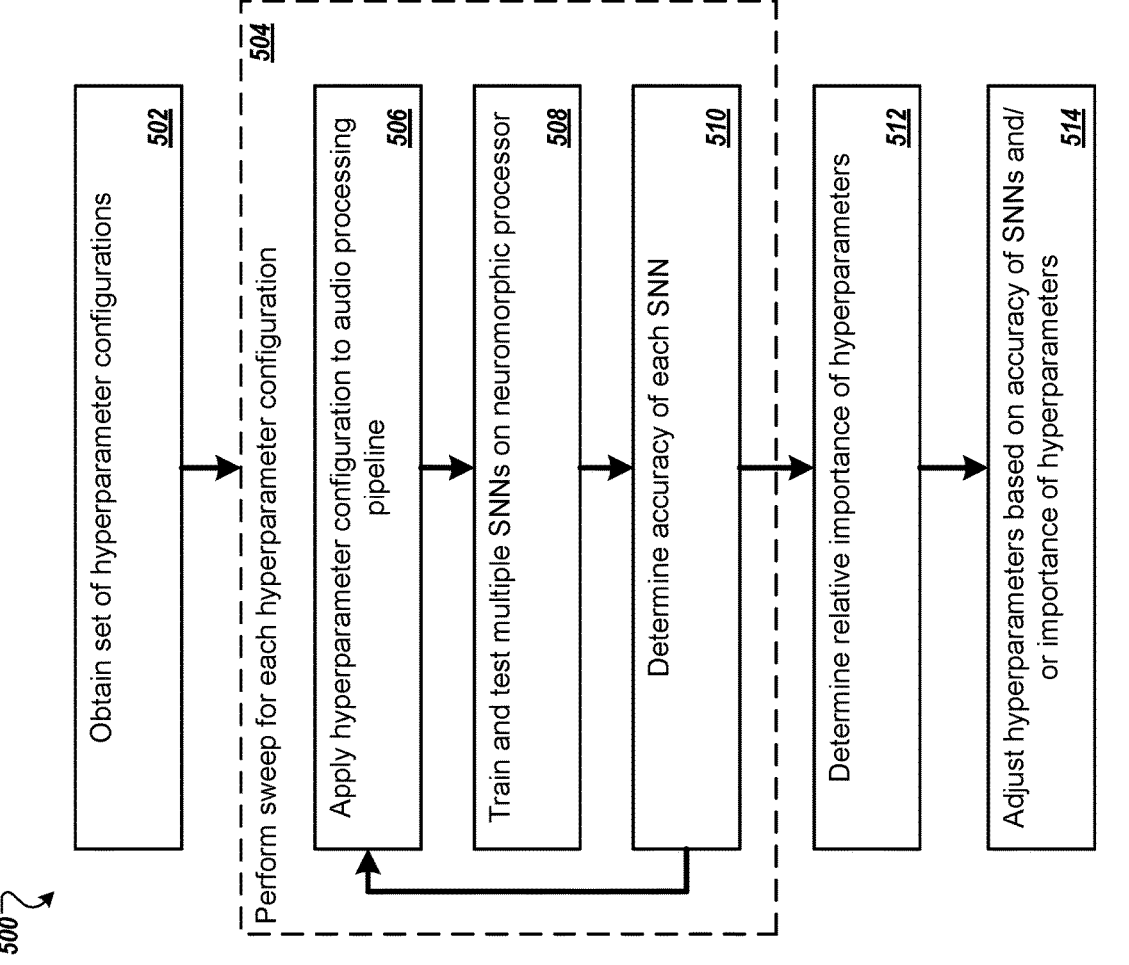
FIG. 5 is a flow diagram of an example process for adjusting hyperparameters of an audio to spikes conversion pipeline.

In some implementations, the hyperparameter adjuster 128 selects hyperparameters to use or not use based on the relative importance and/or the computational cost of each hyperparameter. For example, if a hyperparameter is moderately important but has the highest computational cost, the hyperparameter adjuster 128 may turn off that hyperparameter to increase the efficiency of the conversion to spikes. In some implementations, a user, e.g., a software developer, can make these selections and configuration of the audio to spikes conversion pipeline 122 accordingly. An example process for adjusting the hyperparameters of the audio to spikes conversion pipeline is shown in FIG. 5 and described below.

The computing device 102 can deploy one of the SNNs from the sweeps on the neuromorphic processor 124. For example, the computing device 102 can select the highest performing SNN in terms of accuracy or other evaluation criteria for speech recognition using the hyperparameter configuration selected for the audio to spikes conversion pipeline 122.

Figure 2:
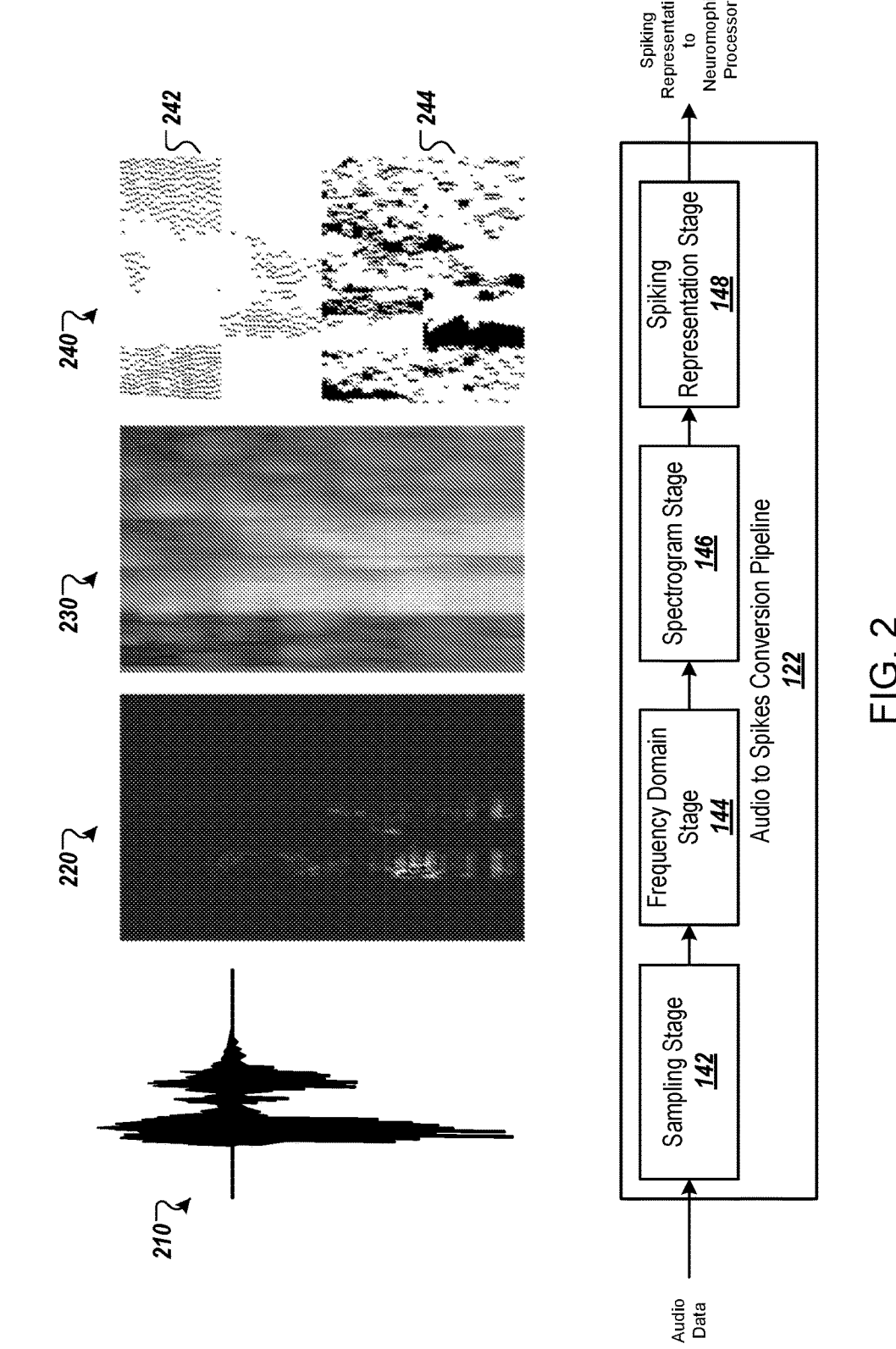
FIG. 2 shows four stages of an example audio to spikes conversion.

FIG. 2 shows four stages 142-148 of the example audio to spikes conversion pipeline 122. The four stages can include, for example, a sampling stage 142, a frequency domain stage 144, a spectrogram stage 146, and a spiking representation stage 148. The processing of each stage can be performed by a respective component of the audio to spikes conversion pipeline 122, such as a respective engine, software module, or processor of the audio to spikes conversion pipeline 122. For example, the sampling stage 142 can be performed by a sampling engine, the frequency domain stage 144 can be performed by a frequency domain engine, the spectrogram stage 146 can performed by a spectrogram engine, and the spiking representation stage 148 can be performed by a spiking representation engine. The processing of the stages 142-148 can be performed in software and/or on hardware accelerators, either sequentially or in parallel.

In the sampling stage 142, the audio to spikes conversion pipeline 122 starts with obtaining audio data 210, which can be in the form of raw audio or audio that has been pre-processed. Examples of pre-processing can include reducing noise in the audio data, e.g., using a filtering mechanism or through sound localization. The audio data 210 can be obtained from a file or memory or from an active microphone. In some examples, the computing device 102 can obtain the audio data 210 with a predetermined sampling rate. For example, the raw audio can be 16 KHz, 16-bit raw audio. The audio data 210 can be obtained with other sampling rates and/or bit precision recordings.

In the sampling stage 142, the audio data 210 can be centered and/or scaled. For example, the audio to spikes conversion pipeline 122 can center the audio data 210 by subtracting an estimate of the bias and scaling to achieve a peak-to-peak amplitude threshold, such as a peak-to-peak amplitude of 0.5 or another appropriate value. The audio to spikes conversion pipeline 122 can center and scale the audio data 210 sample-by-sample. In some cases, the bias is often small enough to be ignored.

In the frequency domain stage 144, the audio to spikes conversion pipeline 122 converts the audio data into audio signals in a frequency domain. The audio to spikes conversion pipeline 122 can perform this conversion using a Fast Fourier Transform (FFT), a Sliding Discrete Fourier Transform (SDFT), or another appropriate mechanism for obtaining a frequency domain representation of audio data 210. For example, the audio to spikes conversion pipeline 122 can apply the SDFT to the audio data 210 to encode the audio data to the frequency domain to mimic how the cochlea acts as a filter bank, performing a Fourier decomposition of the incoming audio. The SDFT is an incremental method for computing the power spectrum of the audio data 210. The incremental computation can be faster than a full FFT in some cases, e.g., depending on the hop size of the FFT. Further, SDFT can operate in constant time complexity on a sample-by-sample basis through parallelization and hardware acceleration.

The output of the frequency domain stage 144 can include a frequency domain representation of the audio data 210 and can include an instantaneous representation of the spectral content of the audio signal, which represents the power of the frequencies that make up the audio signal. These instantaneous representations can be appended in succession to generate a spectrogram 220.

In the spectrogram stage 146, the audio to spikes conversion pipeline 122 maps the frequency domain representation of the audio data 210 onto a set of frequency bands and can produce a spectrogram 230. For example, the audio spikes conversion pipeline 122 can map the frequency domain representation of the audio data 210 onto a set of Mel-scale frequency bands to produce a log-Mel spectrogram 230. The audio to spikes conversion pipeline 122 can also log transform, center, and scale the frequency domain audio signals again. For example, the generate a log-Mel spectrogram 230, the audio to spikes conversion pipeline 122 can map the frequency domain output by the frequency domain stage 144 on a Mel-scale that represents how humans perceive speech pitch, apply another transformation that uses overlapping windows of a particular shape (e.g., triangular, cosine, etc.) and width to non-linearly weight the frequencies in accordance with a human level of perception. After weighting the frequencies in this manner, the audio to spikes conversion pipeline 122 can take the log of the output to obtain the log-Mel spectrum. Mel-scale frequency bands, or Mel features, are frequency features in the range of human speech. By mapping the frequency domain (e.g., SDFT features) to the Mel-scale frequency bands, the audio to spikes conversion pipeline 122 can generate Mel features that represent the human speech portion of the audio data 210, e.g., by highlighting the frequencies that humans are good at differentiating.

In some implementations, the spectrogram stage 146 can be optional. In some examples, after computing the frequency domain representation, the power spectra of the frequency domain audio signals are converted to a number of Mel-scale frequency bands (e.g., 10, 20, 30, or another appropriate number of Mel-scale frequency bands), then a log transform is applied to the converted audio signals. At this point in the audio to spikes conversion pipeline 122, the data are log-Mel spectra with temporal resolution equal to the audio sampling rate. In some implementations, the audio to spikes conversion pipeline 122 can continue with this resolution. When training SNNs using Back-Propagation-Through-Time (BPTT), the number of time steps in each processed spike raster can severely impact overall training time. To avoid such impact, the audio to spikes conversion pipeline 122 can down-sample the spectra to time steps, e.g., time steps of 5, 10, 20, or another appropriate number of milliseconds (ms) time steps.

In some implementations, the audio to spikes conversion pipeline 122 stacks the log-Mel signals multiple times. For example, after down-sampling, the 20 log-Mel signals can be stacked four times resulting in 80 total log-Mel signals. Here, stacking refers to concatenating separate features with the log-Mel features, e.g., over time. For example, these features can include features derives from the log-Mel representation, such as the cumulative sum of a feature over time. In another example, separate arrays can be concatenated into one array, e.g., repeating the same signal represented as an array multiple times.

Figure 4A:
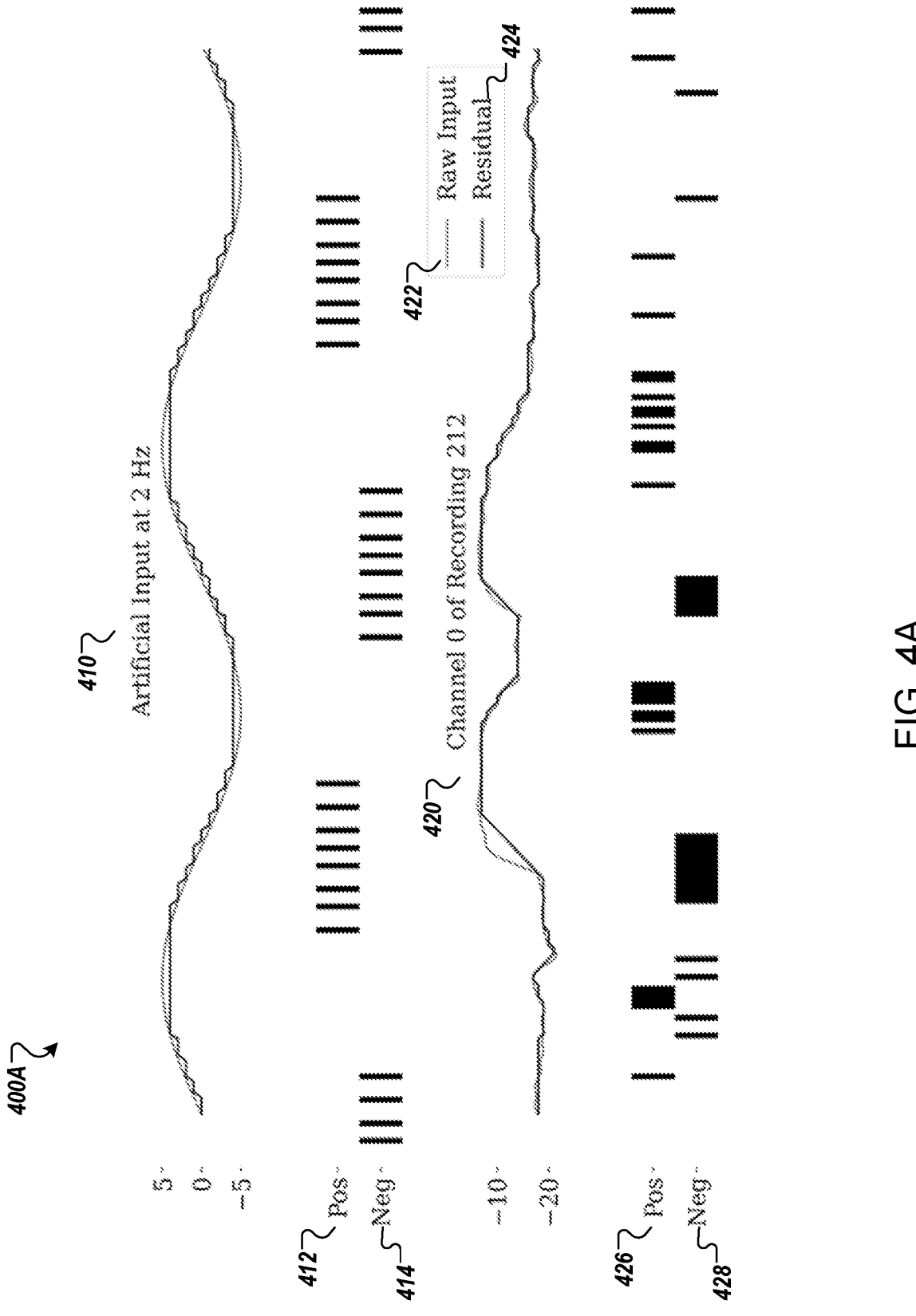
FIGS. 4A-4B show an example process of generating spikes for audio signals.
Figure 4B:
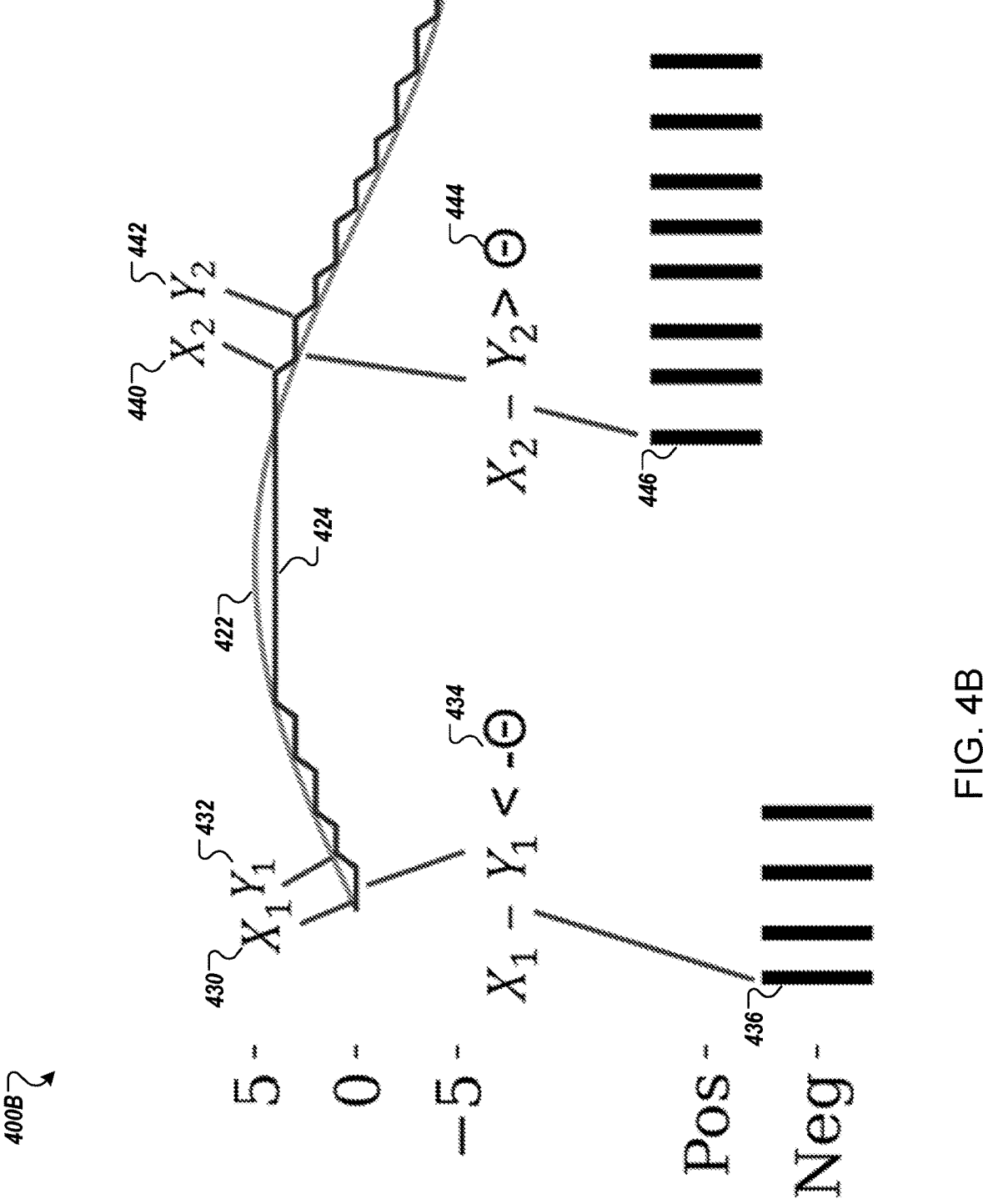

In the spiking representation stage 148, the audio to spikes conversion pipeline 122 converts the log-Mel signals, e.g., stacked log-Mel signals, to a spiking representation 240. The audio to spikes conversion pipeline 122 can convert the stacked log-Mel signals to spikes using a step-forward algorithm. FIGS. 4A-4B show an example process of generating spikes using a step-forward algorithm. The step-forward algorithm converts a continuous-valued signal into spikes.

The step-forward algorithm can include one or more of multiple types of delta modulation, which may also be referred to as differential pulse-code modulation. In one type, which can be referred to as discrete derivative, consecutive analog signals are quantized and the difference between the consecutive signals is determined. In another type, which can be referred to as an integral value approach, the difference is taken with respect to an integrator which is basically a value that tracks the signal over time. In other words, the difference between an instantaneous value and the integrated value of the signal over time is used instead of a difference between two consecutive signals. Both types of delta modulation can work in the audio to spikes pipeline 122, but the second type using the integrated signal may provide performance improvements relative to the discrete derivative approach.

In a differential derivative approach, the step-wise difference between the continuous signals can be calculated. If the step-wise difference satisfies a threshold in either the positive or negative direction, a spike of the corresponding polarity is generated. By calculating the step-wise differences, a set of spikes (positive spikes and/or negative spikes) can be generated. The spikes can represent the change of the audio information (e.g., log-Mel signals). The spikes can represent the quantized, non-negative discrete derivative of the log-Mel signals.

In an integrated value approach, the integral of the signal can be computed over time. For each new signal, the difference between a new instantaneous value of the signal and the integrated value is calculated. The set of spikes can be generated based on this difference, similar to the differential derivative approach.

In addition to the set of spikes based on these differences, the audio to spikes conversion pipeline 122 can generate another set of spikes based on cumulative sums of the log-Mel signals, e.g., cumulative sum spikes. The cumulative sum spikes can be calculated by calculating a quantized total of each log-Mel signal. The cumulative sum spikes can represent the spike encoding of the sustained value of audio information (e.g., log-Mel signals). As shown in FIG. 2, the generated spikes for the audio 210 can include the step-wise difference spikes 242 and the cumulative sum spikes 244. The generated spikes can be processed by SNNs for speech recognition.

In some implementations, the hyperparameters used in the different stages of the audio to spikes conversion pipeline 122 can be determined by the hyperparameter adjuster 128. For example, the hyperparameters can include spike encoding method, threshold, hop length (ms), time step (ms), log spectral features, spectral features, number of channels, and other appropriate hyperparameters. The hyperparameter adjuster can perform hyperparameter sweeps using multiple sets of hyperparameter configurations and select a hyperparameter configuration that results in the best SNN accuracy. For example, the hyperparameter adjuster can perform sweeps for three different spike encoding methods including the Delta method, Rate method, and step-forward method. Based on the results of the sweeps, the hyperparameter adjuster can determine that the best spike encoding method is the step-forward method.

Figure 3:
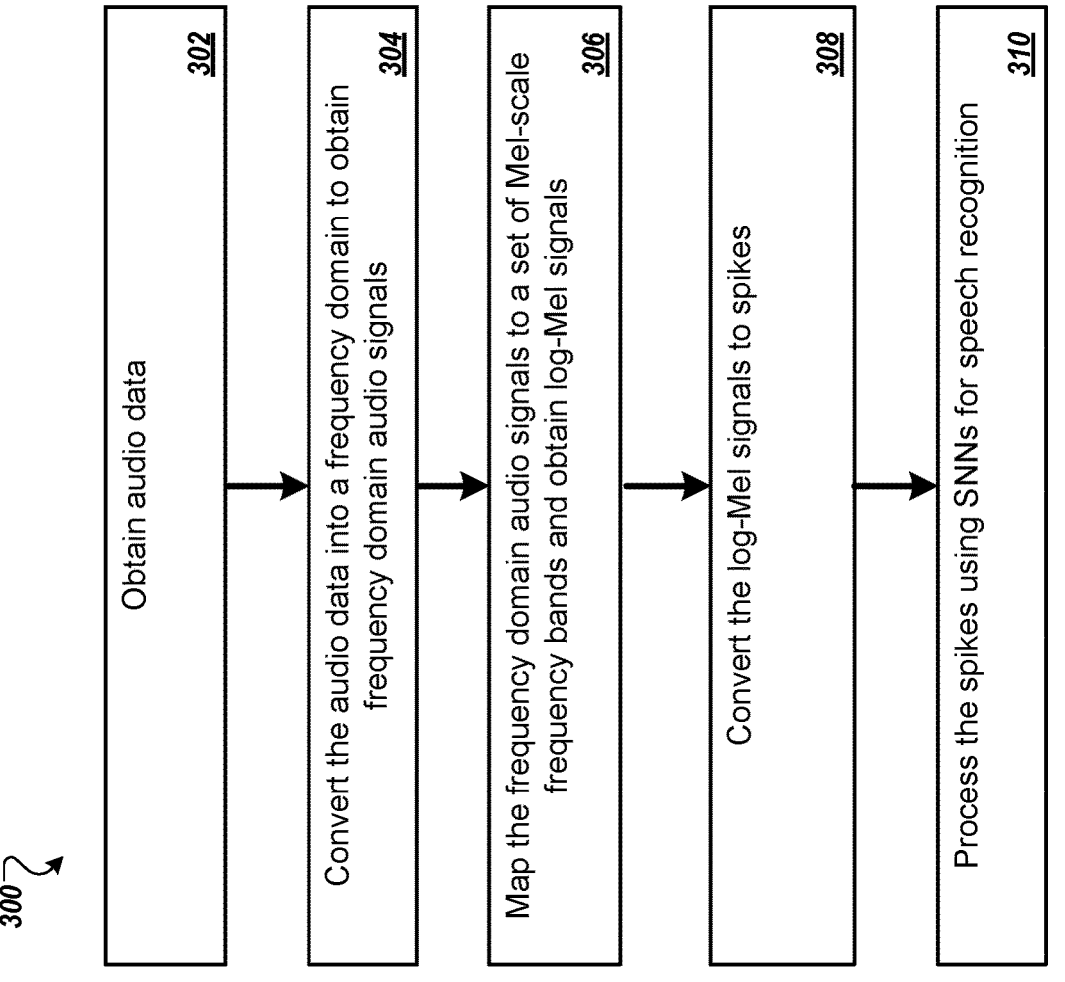
FIG. 3 is a flow diagram of an example process for converting audio data to spikes and processing the spikes using an SNN to recognize speech sounds.

FIG. 3 is a flow diagram of an example process 300 for converting audio data to spikes and processing the spikes using an SNN to recognize speech sounds. In some implementations, at least a portion of the process 300 can be executed at the computing device 102.

At step 302, the computing device obtains audio data. For example, the computing device can obtain the audio data in real time from a microphone. The microphone can be located inside the computing device or outside the computing device. In some examples, the computing device can obtain the audio data from a storage device or a memory of the computing device.

In some examples, the computing device can obtain the audio data with a predetermined sampling data. For example, the obtained audio data can be 16 KHz, 16-bit raw audio. Other frequencies and bit precision recording can also be used.

In some implementations, the raw audio data can be centered and scaled. For example, the computing device can center the raw audio data by subtracting an estimate of the bias (in practice, the bias is often small enough to be ignored), and scale the raw audio to achieve a predetermined peak-to-peak amplitude, such as 0.5, 0.7, 1.0, or another appropriate value.

At step 304, the computing device converts the audio data (e.g., the centered and scaled audio data) into a frequency domain to obtain frequency domain audio signals. A Fourier transform can be applied to the audio data to encode the audio data to the frequency domain. For example, an SDFT can be applied to incrementally compute the Fourier transform of the audio data as follows:

$$F_t^k = G_M^k (F_{t-1}^k - f_{t-M} + f_t)$$

where $F_t^k$ is the DFT's frequency at the kth bin at time step t computed from samples $f_{t-M+1}$, $f_{t-M+2}$, . . . , $f_t$, where $0 \leq k \leq M-1$, t is the time step in the sliding window of length T, and $G = e^{j2\pi/M}$ is a scaling factor.

This incremental computation can be much faster than the typical method for performing continuous speech recognition with a FFT, where the audio signal is sliced into overlapping windows and a DFT is computed for each window. Further, SDFT is able to operate in constant time complexity on a sample-by-sample basis through parallelization and hardware acceleration.

At step 306, the computing device maps the frequency domain audio signals to a set of Mel-scale frequency bands and obtains log-Mel signals. Specifically, the frequency domain audio signals can be mapped to a set of Mel-scale frequency bands to obtain Mel-scale frequency audio signals. Mel-scale frequency bands, or Mel features, are frequency features in the range of human speech. The Mel-scale frequency audio signals can then be log transformed, to obtain the log-Mel signals.

In some implementations, the computing device can down-sample the log-Mel signals. The down-sampling can preserve performance while allowing for the audio to spikes conversion pipeline 122 to be run in real-time. For example, the log-Mel signals can be down-sampled to 5 ms time steps or other appropriate time steps.

The computing device can stack, e.g., concatenating, the log-Mel signals for predetermined times. For example, after computing the SDFT, the frequency domain audio signals are converted to a number (e.g., 5, 10, 20, 30, etc.) of Mel-scale frequency bands. The log-Mel signals can be stacked four times resulting in four blocks of 80 total units' log-Mel signals, with each block including 20 units' log-Mel signals. For example, the four blocks can represent the log-Mel spikes, the cumulative sum of the log-Mel spikes and two channels for each of them. If binary data is being sent, there is no way to represent a negative. So, negative and positive changes are broken out into two separate channels. Other appropriate numbers of blocks can be used. In some implementations, each log-Mel signal in the stack can be centered and scaled using static estimates of the mean and standard deviation derived from trail runs of data driven feature extraction.

At step 308, the computing device converts the log-Mel signals to spikes. The converting of log-Mel signals to spikes can be using a step-forward algorithm. This algorithm can encode a continuous-values signal into multiple channels of spikes by taking the step-wise difference between the continuous signals. When the step-wise difference satisfies (e.g., exceeds) a threshold in either the positive or negative direction, a spike of the corresponding polarity is generated.

Step-forward is useful for neuromorphic speech recognition systems because it can be implemented efficiently on general-purpose processors for a reasonable number of channels.

FIGS. 4A-4B show an example process of generating spikes for audio signals. FIG. 4A shows the step-forward algorithm using the integral value approach being applied to two streaming signals: artificial input 410 and the raw audio recording 420. For each streaming signal, there is a residual signal that represents the integrated value generated by an integral based delta modulation. For example, for raw input 422 of the raw audio recording, there is a residual signal 424 that represents the integrated value. Using the residual signals, the two streaming signals 410 and 420 are converted to spikes. For example, the artificial input 410 is converted into positive spikes 412 and negative spikes 414. The raw audio recording 420 is converted into positive spikes 426 and negative spikes 428. The step-forward algorithm converts a continuous-valued signal into a binary signal, interpretable as a spike, by quantizing the signal, taking the difference between the raw input 422 and the residual signal 424, and applying a threshold.

For example, the instantaneous value of the raw input 410 can be compared to the residual signal 424. The difference between these two signals are then used to generate the spikes. Then, the residual signal 424 is modified by the quantized result. For example, if the instantaneous value of the raw signal 410 is greater than the residual signal 424, the residual signal 410 is increased. Similarly, if the instantaneous value of the raw signal 410 is less than the residual signal 424, the residual signal 410 is decreased.

FIG. 4B shows the process of generating spikes using the step-forward algorithm. In this example, the spikes are generated for the raw audio recording streaming signal 420 in FIG. 4A. For the raw input 422 of the raw audio recording, there is a residual signal 424 that represents the integrated value of the signal over time.

The difference between the continuous raw input signals 422 and the residual signal 424 can be calculated. A difference between the log-Mel signals of two signals is determined. If the difference satisfies a threshold in either the positive or negative direction, a spike of the corresponding polarity is generated. In other words, when the absolute value of the difference satisfies a threshold, a positive or negative spike can be generated. For example, a residual signal $X_1$ 430 and the actual signal $Y_1$ 432 are shown. The residual signal $X_1$ is compared to the actual signal $Y_1$ and the difference is quantized if it is greater than a threshold. For example, when the difference $X_1-Y_1$ satisfies (e.g., less than) a negative threshold $-\theta$ 434, a negative spike 436 can be generated. Similarly, when the difference between residual $X_2$ and actual signal $Y_2$ satisfies (e.g., larger than) a positive threshold $\theta$ 444, a positive spike 446 can be generated.

By calculating the differences, a set of spikes (positive spikes and/or negative spikes) can be generated. The spikes can represent the change of the audio information (e.g., log-Mel signals). That is, only if there are changes or new information available, the changes or new information can be captured and processed. In this way, the processed audio information is reduced, thus allowing for speech recognition on power-constrained devices.

In addition to the set of spikes based on the differences, the computing device can generate spikes based on cumulative sums of the log-Mel signals, e.g., cumulative sum spikes. The cumulative sum spikes can be determined by calculating a quantized total of each log-Mel signal. For example, a cumulative sum can be applied over time to each log-Mel signal to derive cumulative sum spikes. The cumulative sum spikes can represent the spike encoding of the sustained value of audio information (e.g., log-Mel signals). In some implementations, the cumulative sum spikes can be concatenated to the difference spikes. For example, the spikes for the first and second blocks (e.g., units 0 through 39) can represent difference spikes, e.g., the quantized, discrete derivative of the continuous signal values. The spikes in the third and fourth blocks (e.g., units 40 to 79) can represent the cumulative sum spikes, e.g., sustained value of the log-Mel signals rather than only changes. The multiple sets of spikes including the step-wise difference spikes (e.g., positive signal spikes and negative signal spikes) and the cumulative sum spikes (e.g., positive accumulative spikes and negative accumulative spikes) can be input to SNNs for speech recognition.

In some implementations, the log-Mel features and the cumulative sum can be provided as input to the spiking representation stage 148 together. Each channel can then be converted into spikes separately.

At step 310, the computing device can process the spikes using SNNs for speech recognition. For example, the computing device can execute an SNN using the spikes as input. The SNN can process the spikes to generate speech recognition results that include texts, e.g., words or phonemes, corresponding to speech in the audio data. For example, the SNN can predict speech sounds in the form of phonemes based on the spikes received from the audio to spikes conversion pipeline 122. The phonemes can then be processed by another component, e.g., a lexicon and/or language model to generate words or sentences corresponding to the phonemes.

The computing device or another device can perform an action based on the speech recognition result. For example, an AI assistant can perform an action (e.g., play a song, order an item, etc.) based on the words or sentence. The speech recognition results can be displayed in a user interface of a user device. In some examples, the computing device can be the user device. In some other examples, the computing device can be a different device from the user device.

The order of steps in the process 400 described above is illustrative only, and the process 400 can be performed in different orders. In some implementations, the process 400 can include additional steps, fewer steps, or some of the steps can be divided into multiple steps.

The techniques described in this document can be used to train SNNs with the described audio to spikes conversion pipeline 122. For example, a feedforward SNN architecture can include an input layer of 80 (or another appropriate number of) neurons that take as input one second audio sample encoded to spikes by the audio to spikes conversion pipeline 122 over 200 time steps, three hidden layers of 256 Leaky Integrate-and-Fire (LIF) neurons each, and an output layer of 35 LIP neurons or 20 LIF neurons. For example, the input layer can include a number of layers equal to the number of stacked Mel-signals/features.

In some implementations, SNNs can be trained using snnTorch that enables efficient surrogate gradient learning for SNNs. Models can be trained using spike rate output: the output unit corresponding to the target class can be assigned a high target spike rate (e.g., 50 spikes/sec), while non-target output units can be assigned a low target spike rate (e.g., 5 spikes/sec). The training loss can be calculated by snnTorch using the mean-squared error of the actual spike rates and the target spike rates. Loss can be back-propagated using the fast sigmoid surrogate gradient and parameters can be updated using the Adam optimizer. The output class of the model can be determined by selecting the index of the output unit with the highest total number of spikes for a recording.

In some implementations, the system can train an SNN model using hardware-aware training methods. For example, the system can train an SNN model with the feedforward 5-layer architecture using SLAYER and a functional neuromorphic hardware simulator, e.g., a simulator of Intel's Loihi chip. SLAYER is a surrogate gradient training framework built on pyTorch that supports the Current-Based Leaky Integrate-and-Fire (CUBA LIF) neuron model and provides a direct, hardware-aware training process to simplify the deployment of trained models. SLAYER trains fill-precision shadow weights which get quantized during the forward inference phase to the same precision supported by the target hardware.

The techniques described in this document can determine the hyperparameters for the audio to spikes conversion pipeline 122. In some implementations, the system can interact with a platform that enables distributed model optimization while keeping a shared record of all parameters and performance metrics. The system can conduct a hyperparameter sweep to identify the best combination of hyperparameters for the audio to spikes conversion pipeline 122. For the sweeps, in offline training instead of running real-time conversion and inference, the system can use standard FFTs in the audio to spikes conversion pipeline 122 which is more efficient for batch processing than the SDFT that the pipeline normally uses to enable low single sample latency for streamed audio. The sweeps can generate an estimate of the relative importance for each hyperparameter. The relative importance is the degree to which each hyperparameter was useful in predicting a chosen metric. The importance can be calculated from the feature importance values of a random forest trained with the hyperparameters as inputs and the metric as the target output. The classification accuracy can be chosen as the metric to optimize for the sweeps. In some implementations, the hyperparameters can include spike conversion, threshold, hop length (ms), time step (ms), log spectral features, spectral features, number of channels, and other appropriate hyperparameters.

The audio to spikes conversion pipeline 122 is an efficient audio processing pipeline for real-time, neuromorphic speech recognition systems. SNNs trained on data output by the audio to spikes conversion pipeline can achieve high accuracy in keyword classification. The pipeline can offer a more suitable spiking benchmark for speech recognition. The efficiency of the pipeline can enable a greater number of spiking speech recognition benchmarks in neuromorphic speech recognition.

The pipeline is more suitable for real-time operation and is suitable for use in a real-time speech recognition system. The techniques described in this document can lead to wider adoption of neuromorphic accelerators in edge devices to provide voice control, which can have cascading impacts on the intelligence that can be feasibly integrated into these devices. Neuromorphic accelerators can offer multiple application-level benefits, including continuous learning and multimodal processing.

FIG. 5 is a flow diagram of an example process 500 for adjusting hyperparameters of an audio to spikes conversion pipeline. In some implementations, at least a portion of the process 500 can be executed by a computing device configured to train and assess the performance of machine learning models, such as server 110 or server 112. For brevity, the process 500 is described as being performed by a server.

At step 502, the server obtains multiple sets of hyperparameter configurations. In some implementations, the hyperparameter configurations include configuring a set of hyperparameters with different values. For example, one hyperparameter can be time step. The configuration of the time step can include 4 ms, 8 ms, 16 ms, 32 ms, 64 ms, and 128 ms. The set of hyperparameters can include spike encoding method, threshold, hop length (ms), time step (ms), log spectral features, spectral features, number of channels, and other appropriate hyperparameters.

At step 504, the server performs sweeps for each hyperparameter configuration. Each sweep can include applying the particular hyperparameter configuration to the audio to spikes conversion pipeline (step 506), training, on the neuromorphic processor, multiple SNNs using training data and spikes generated by the audio to spikes conversion pipeline based on the training data, and testing each of the multiple SNNs using testing data (step 508), and determining the accuracy of each SNN based on the test (step 510). The training data and/or the testing data can include labeled audio data with labels indicating speech sounds, e.g., words or phonemes, corresponding to the audio data.

The server can perform steps 506-510 multiple times to identify hyperparameters and a trained machine learning model to deploy on the audio to spikes conversion pipeline 122. For example, the server can perform steps 506-510 until finding a trained machine learning model that achieves at least a minimum level of accuracy.

At step 512, the server determines the relative importance of the hyperparameters. The server can determine the relative importance of each hyperparameter based on the results of each sweep. For example, if there is a significant change in the accuracy of the SNNs trained during the sweeps when the configuration of a particular hyperparameter is adjusted, then the particular hyperparameter may have a large impact on the accuracy of the SNNs and is therefore important. The server can evaluate various factors in assessing the importance of each hyperparameter, such as the variance in accuracy of SNNs with changes to the hyperparameter, whether the hyperparameter contributed to the highest accuracy SNN or at least a threshold number of the highest accuracy SNNs, and/or other appropriate factors.

In some implementations, the server can use the importance of each hyperparameter in step 506 to determine hyperparameters to test using steps 506-510. For example, if a hyperparameter is found to be unimportant for a large (e.g., at least a threshold number of) tests, the server can remove the process corresponding to the hyperparameter from the pipeline. In another example, the server can adjust one or more of the hyperparameters based on their importance.

At step 514, the server finalizes the hyperparameters of the audio to spikes conversion pipeline 122 based on the accuracy of SNNs and/or importance of the hyperparameters. The computing device can turn off the use of one or more hyperparameters based on the relative importance of the hyperparameters. The server can also adjust the configuration of one or more hyperparameters based on the accuracy and/or importance. The processing of audio data or intermediate forms of audio data based on each hyperparameter has an associated computation cost (e.g., CPU cycles) and latency. By removing those that are less important, the conversion of audio data to spikes can be performed faster and more efficiently with little or no negative impact on accuracy of the speech recognition results of the SNN. However, some hyperparameters may be more important for some languages and/or dialects. Thus, having the ability to use many hyperparameters and filter some based on importance enables highly accurate speech recognition with highly efficient speech to spikes conversions.

In some implementations, the computing device selects hyperparameters to user or not use based on the relative importance and/or the computational cost of each hyperparameter. For example, if a hyperparameter is moderately important but has the highest computational cost, the hyperparameter adjuster 128 may turn off that hyperparameter to increase the efficiency of the conversion to spikes.

Certain novel aspects of the subject matter of this specification are set forth in the claims below.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit) a neuromorphic research chip, such as Intel's Loihi chip, or a neural network processor, such as BrainChip's Akida™ chip.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus using one or more components of an audio to spikes conversion pipeline, the method comprising:
    obtaining audio data;
    generating frequency domain audio signals that represent the audio data by converting the audio data into a frequency domain;

mapping the frequency domain audio signals into a set of Mel-frequency bands to obtain Mel-scale frequency audio signals;
    performing a log transformation on the Mel-scale frequency audio signals to obtain log-Mel signals;
    generating spike input comprising a series of spikes for input to a spiking neural network (SNN) model by converting the log-Mel signals to the series of spikes;
    providing the spike input as an input to the SNN model;
    for each hyperparameter configuration of a plurality of sets of hyperparameter configurations:
        applying the sets of hyperparameter configurations to the one or more components of the audio to spikes conversion pipeline;
        training multiple test SNN models using training audio data that is converted to spike inputs using the one or more components of the audio to spikes conversion pipeline; and
        testing each test SNN model using testing data, the testing comprising generating result data by determining an accuracy of speech recognition results generated by each test SNN model; and
    updating the sets of hyperparameters based on the result data for each set of hyperparameters, thereby reducing an amount of processing of the audio data without an adverse impact on accuracy of a conversation corresponding to the audio data.

2. The method of claim 1, further comprising:
    executing, the SNN model using the spike input, wherein the spiking neural network processes the series of spikes to generate speech recognition results including text corresponding to the audio data; and
    outputting the speech recognition results.

3. The method of claim 2, further comprising performing an action based on the speech recognition results.

4. The method of claim 1, wherein obtaining the audio data comprises:
    obtaining the audio data from a memory; or
    obtaining the audio data from an active microphone.

5. The method of claim 1, wherein converting the audio data into the frequency domain comprises:
    centering and scaling the audio signals to obtain centered and scaled audio data; and
    converting the centered and scaled audio data into a frequency domain using a sliding window of a predetermined length.

6. The method of claim 1, wherein converting the audio data into the frequency domain comprises converting the audio data using a sliding discrete Fourier transform (SDFT) algorithm.

7. The method of claim 1, wherein converting the log-Mel signals to spike input comprises:
    determining a step-wise difference between the log-Mel signals of two adjacent time steps;
    determining that the step-wise difference satisfies a threshold in either a positive or a negative direction; and
    generating a spike of a corresponding polarity.

8. The method of claim 1, wherein converting the log-Mel signals into spikes comprises determining cumulative sum spikes by calculating a quantized total of each log-Mel signal.

9. The method of claim 1, wherein converting the log-Mel features into spikes comprises:
    stacking the log-Mel features for a plurality of times to obtain stacked features in a plurality of blocks; and converting the stacked features in the plurality of blocks into spikes.

10. The method of claim 1, wherein the one or more components of the audio to spikes conversion pipeline comprises hyperparameters that are adjusted based on a classification accuracy.

11. The method of claim 10, further comprising determining an importance of each hyperparameter based on the result data for each set of hyperparameters, wherein updating the hyperparameters comprises updating at least one hyperparameter based on the importance of the at least one hyperparameter.

12. The method of claim 11, further comprising preventing use of a particular hyperparameter in generating the spike input based on the importance of the given hyperparameter.

13. A system comprising:
one or more processors including a neuromorphic processor; and
one or more storage devices storing instructions that, when executed by the one or more processors, cause the one or more processors to perform operations comprising:
obtaining audio data;
generating frequency domain audio signals that represent the audio data by converting the audio data into a frequency domain;
mapping the frequency domain audio signals into a set of Mel-frequency bands to obtain Mel-scale frequency audio signals;
performing a log transformation on the Mel-scale frequency audio signals to obtain log-Mel signals;
generating spike input comprising a series of spikes for input to a spiking neural network (SNN) model by converting the log-Mel signals to the series of spikes; and
providing the spike input as an input to the SNN model;
for each hyperparameter configuration of a plurality of sets of hyperparameter configurations:
applying the sets of hyperparameter configurations to the one or more components of the audio to spikes conversion pipeline;
training multiple test SNN models using training audio data that is converted to spike inputs using the one or more components of the audio to spikes conversion pipeline; and
testing each test SNN model using testing data, the testing comprising generating result data by determining an accuracy of speech recognition results generated by each test SNN model; and
updating the sets of hyperparameters based on the result data for each set of hyperparameters, thereby reducing amount of processing of the audio data without an adverse impact on accuracy of a conversation corresponding to the audio data.

14. The system of claim 13, wherein the operations comprise:
executing, the SNN model using the spike input, wherein the spiking neural network processes the series of spikes to generate speech recognition results including text corresponding to the audio data; and
outputting the speech recognition results.

15. The system of claim 14, wherein the operations comprise performing an action based on the speech recognition results.

16. The system of claim 13, wherein obtaining the audio data comprises:
obtaining the audio data from a memory; or
obtaining the audio data from an active microphone.

17. The system of claim 13, wherein converting the audio data into the frequency domain comprises:
centering and scaling the audio signals to obtain centered and scaled audio data; and
converting the centered and scaled audio data into a frequency domain using a sliding window of a predetermined length.

18. The system of claim 13, wherein converting the audio data into the frequency domain comprises converting the audio data using a sliding discrete Fourier transform (SDFT) algorithm.

19. One or more computer storage media storing instructions that when executed by one or more processors comprising a neuromorphic processor cause the one or more computers to perform the operations comprising:
obtaining audio data;
generating frequency domain audio signals that represent the audio data by converting the audio data into a frequency domain;
mapping the frequency domain audio signals into a set of Mel-frequency bands to obtain Mel-scale frequency audio signals;
performing a log transformation on the Mel-scale frequency audio signals to obtain log-Mel signals;
generating spike input comprising a series of spikes for input to a spiking neural network (SNN) model by converting the log-Mel signals to the series of spikes; and
providing the spike input as an input to the SNN model;
for each hyperparameter configuration of a plurality of sets of hyperparameter configurations:
applying the sets of hyperparameter configurations to the one or more components of the audio to spikes conversion pipeline;
training multiple test SNN models using training audio data that is converted to spike inputs using the one or more components of the audio to spikes conversion pipeline; and
testing each test SNN model using testing data, the testing comprising generating result data by determining an accuracy of speech recognition results generated by each test SNN model; and
updating the sets of hyperparameters based on the result data for each set of hyperparameters, thereby reducing amount of processing of the audio data without an adverse impact on accuracy of a conversation corresponding to the audio data.

* * * * *